United States Patent Office 3,324,159
Patented June 6, 1967

3,324,159
PROCESS FOR THE PRODUCTION OF ALUMINUM TRIALKYLS AND ALKOXY ALUMINUM DIALKYLS
Herbert Lehmkuhl, Mulheim (Ruhr), Germany, and Wolfram Grimme, New Haven, Conn., assignors to Professor Dr. Karl Ziegler, Mulheim (Ruhr), Germany, a corporation
No Drawing. Filed Apr. 10, 1962, Ser. No. 217,501
Claims priority, application Germany, Apr. 14, 1961, Z 8,675
15 Claims. (Cl. 260—448)

This invention relates to a process for the production of aluminum trialkyls and alkoxy aluminum dialkyls.

It has been found that sodium aluminum tetraalkyls and sodium aluminum alkoxy trialkyls react with aluminum in the presence of mercury to form aluminum trialkyls and alkoxy aluminum dialkyls, respectively, and sodium amalgam. In this reaction, an amount of aluminum which is equivalent to the sodium passes into solution and is bonded to alkyl. The reaction equations are as follows:

in the presence of much Hg $$3NaAlR_4 + Al + 3Hg \rightarrow 4AlR_3 + 3NaHg \quad (1)$$

or $$3Na[AlR_3(OR')] + Al + 3Hg \rightarrow$$
$$3AlR_2(OR') + AlR_3 + 3NaHg \quad (2)$$

wherein the R's are alkyl and preferably those having chain lengths up to 8 carbon atoms, R' represents alkyl, preferably those having from 1 to 12 carbon atoms, and cycloalkyl.

The process can be utilized with great advantage in combination with other reactions to produce aluminum trialkyls and alkoxy aluminum dialkyls from aluminum of any type, even from lumpy aluminum and particularly from aluminum scrap. For this purpose, it is only necessary to recover the sodium from sodium amalgam by electrolysis using the process of U.S. patent application Ser. No. 27,219, filed May 5, 1960, and now abandoned and to convert it with hydrogen into sodium hydride, whereupon the sodium hydride is again added by the process of U.S. Patent 2,826,598 to ¾ of the aluminum trialkyl obtained in accordance with the invention and is alkylated with olefin to form sodium aluminum tetraalkyl thereby restoring the initial condition of the process of the invention.

It is now possible with the use of alkoxy aluminum dialkyls and with appropriate selection of the radical OR' e.g. with the use of the butoxy group and higher alkoxy groups up to $C_{10}$ or $C_{12}$ and, if desired, still higher radicals to separate the aluminum trialkyl from alkoxy aluminum dialkyl in a simple manner by distillation. The latter compound is then re-converted with NaH and an olefin into sodium alkoxy aluminum trialkyl. This method where the cyclic process proceeds via regeneration of sodium alkoxy aluminum trialkyls may offer advantages over the direct route via cleavage of the sodium aluminum tetraalkyls because the reaction of alkoxy aluminum dialkyls with NaH and olefin is better handled with equal space-time yield than the reaction of aluminum trialkyls with NaH and olefin. The reason is as follows:

In both reactions, an excess of NaH must be avoided since otherwise undesirable side reactions will occur, i.e. intermediary formation of sodium ethyl and spontaneous dissociation of the same leading to brown-colored and impure reaction products. It is preferable to use an about 5 to 10% excess of the aluminum-organic compound. In the reaction of alkoxy aluminum dialkyls, this excess does not disturb at all due to the absence of the "growth reaction" in case of these compounds. However, in case of aluminum trialkyls, this excess has the effect that part of the sodium aluminum tetraalkyl is "grown" to higher alkyl compounds. Thus, for example, sodium aluminum tetraethyl formed from NaH, aluminum triethyl and ethylene contains a marked percentage of butyl groups. However, the advantage of easier regeneration of the alkoxy complexes can only be achieved at the cost of a separation of the reaction products by distillation.

In cleaving the alkyl complexes in accordance with Equation 2 in a continuously operated cyclic process, all of the alkoxy aluminum dialkyl formed must be returned into the regeneration step, i.e. this embodiment of the process is not suitable to obtain newly formed alkoxy aluminum dialkyls. This object can be achieved by two possible routes:

(1) The reaction mixture of 3 moles $AlR_2OR'$ and 1 mol $AlR_3$ obtained according to Equation 2 is carefully mixed with 1 mol alcohol to obtain 4 moles $AlR_2OR'$, of which 3 moles are passed into the regeneration step and 1 mol can be withdrawn as a newly formed product; or (2) The cleavage reaction is directed such that only three of four moles $NaAlR_3OR'$ charged are cleaved according to $$3NaAlR_3OR' + Al + 3Hg \rightarrow$$
$$3AlR_2OR' + 3NaHg + AlR_3 \quad (3)$$

The remaining 1 mol $AlR_3$ will then react in known manner disclosed in U.S. patent application Ser. No. 792,467, filed February 11, 1959:

$$NaAlR_3OR' + AlR_3 \rightarrow NaAlR_4 + AlR_2OR' \quad (4)$$

When combining the two reactions, the result is:

$$4NaAlR_3OR' + Al + 3Hg \rightarrow$$
$$NaAlR_4 + 4AlR_2OR' + 3HgNa \quad (5)$$

Three of the four moles $AlR_2OR'$ pass to regeneration while 1 mol has been newly formed.

The $NaAlR_4$ formed as a by-product is carefully mixed with 1 mol alcohol and fed to another cleavage reaction together with the 3 moles $NaAlR_3OR'$ from the regeneration step.

At the first glance, this combination of different operational steps may appear more complicated than, for example, the direct synthesis of aluminum trialkyls by contacting finely divided aluminum, olefins and hydrogen in the presence of pre-formed finished aluminum trialkyls under a pressure of more than 20 kgs./sq. cm. and preferably of 60 to 250 kgs./sq. cm. as described, for example, in U.S. patent application Ser. No. 573,470, filed March 23, 1956, now Patent Number 3,207,770. However, the new process offers a number of advantages over prior art processes. First of all, it permits the use of any waste or scrap aluminum and the necessity of converting aluminum into a highly reactive and finely divided form is completely eliminated. Furthermore, the entire reaction cycle described above can be performed under a very much lower pressure and with much higher space-time yield than the direct synthesis disclosed in U.S. Patent 3,032,574, and U.S. patent application Ser. No. 573,470.

The process of the invention is somewhat similar to the electrolytic synthesis of aluminum trialkyls described in U.S. Patent 2,985,568 and U.S. patent applications Ser. Nos. 27,220 and 27,218, both filed May 5, 1960 and now abandoned. Its efficiency is practically the same as that of this process without the necessity, however, of having an electrolytic cell to be charged with solid aluminum as the anode. This cell is replaced by the separation of sodium metal from sodium amalgam, which separation is technologically very simple and can be effected in an extremely simple manner with low consumption of power.

Mercury losses practically are not encountered in the process of the invention so that the economy of the process is not made questionable from this side either.

The process is particularly well suited for the production of aluminum triethyl. However, it is also applicable to other aluminum trialkyls. It is not operable with potassium aluminum tetraalkyls but can be operated with mixtures of sodium aluminum tetraalkyls and potassium aluminum tetraalkyls, which is desirable sometimes for lowering of the melting point. In the latter case, only the sodium compound is reacted away from the mixture.

The process of the invention is conveniently carried out at temperatures in excess of 60° C. and preferably of 85 to 160° C. However, still higher temperatures up to 200–250° C. and approaching the limit of stability of the complex or non-complex aluminum compounds charged may be used. However, the reaction of the invention will also take place at temperatures below 60° C. to as low as room temperature if the melting point of the complex compounds charged is sufficiently low to ensure satisfactory contact between the liquid mercury, the complex compound and the aluminum metal. The pressure used may be atmospheric. However, olefin pressures of not more than 2 to 5 kgs./sq. cm. may also be used.

The reaction may be effected in the presence of a solvent, aromatic hydrocarbons being particularly well suited solvents for the complex alkali aluminum tetraalkyls. Ethers or tertiary amines are also usable as solvents but lead to the formation of etherates or tertiary aminates of the aluminum trialkyls.

In producing aluminum trialkyls, it is desirable that the sodium amalgam formed during the reaction does not contain more than about 0.7% Na since the reverse reaction

$$3NaHg + 4AlR_3 \rightarrow 3NaAlR_4 + Al + 3Hg \qquad (6)$$

will take place above this concentration.

In producing alkoxy aluminum dialkyls in accordance with Equation 5, this risk is absent since alkoxy aluminum dialkyls are stable even to metallic sodium at these temperatures. However, in this case a limitation of the Na content in the amalgam results from the Na–Hg melting point diagram since mixtures higher in Na content than 1% are solid at temperatures below 100° C.

EXAMPLE 1

The reaction vessel used was a glass tube of about 45 mm. in inside diameter and about 1 m. in length, which was constricted at the lower end to 12 mm. inside diameter. The glass tube having the smaller cross section was U-shaped with each leg having a length of 12 cm., was bent downwardly once again at the open end for about 2 cm. and served as an outlet for the sodium amalgam. The wider glass tube was provided with a jacket of glass used to heat the tube to 138° C. by means of xylene vapor. Aluminum chips packed as tightly as possible were fed to the inner glass tube. At a level of about 95 cm., a glass tube was attached by fusion, passed through the outer jacket and then bent downwardly at a right angle and connected with a 1 liter flask by means of a ground glass joint. The reaction vessel was dried and filled with inert gas. Then the U-tube was filled with mercury and thereafter the reaction leg was filled with molten sodium aluminum tetraethyl, the level of the latter being about 3 cm. below the lateral nozzle fused on at the top.

Mercury from a mercury stock of 37.5 kgs. was added dropwise from above into the reaction tower at a rate of 20 to 30 ml./minute by means of a dropping funnel. The residence time determined experimentally was about 15 seconds. The entire Hg stock was passed three times through the reaction tower and then had a sodium concentration of 0.3% and contained a total of 112.5 gms. sodium. $Al(C_2H_5)_3$ formed in the reaction settled after saturation of the complex salt layer above the molten $NaAl(C_2H_5)_4$ as a second, non-miscible phase and was displaced from time to time through the lateral overflow pipe into the stock vessel by adding molten $NaAl(C_2H_5)_4$.

To determine the yield, the 2-phase mixture was drained from the reaction tower because of the solubility of $Al(C_2H_5)_3$ in molten $NaAl(C_2H_5)_4$ (15% at 130° C.), and the $Al(C_2H_5)_3$ was distilled off from this mixture by heating to a temperature of 150° C. (measured in the liquid phase) under a vacuum of $10^{-3}$ mm. Hg. This measure is, of course, unnecessary with a continuously operated apparatus since constant saturation of the complex salt melt with $Al(C_2H_5)_3$ is established and all of the further $Al(C_2H_5)_3$ formed separates as the second phase and can be withdrawn. A total of 732 gms. aluminum triethyl (97.8% of the theoretical amount, based on sodium set free) was obtained. Of this amount, 171 grams, i.e. 91.4% of the theoretical amount, were newly formed.

Three quarters of the aluminum triethyl formed were reconverted in a manner known per se with NaH and ethylene into sodium-aluminum tetraethyl while one quarter can be withdrawn as newly formed $Al(C_2H_5)_3$.

Space-time yield: 54 gms. of newly formed $Al(C_2H_5)_3$/hr./liter of free reaction space.

The capacity of the reaction tower described above for aluminum is about 300 to 600 gms. depending upon the bulk density of the aluminum chips. Only a fraction of this aluminum is dissolved during the experiment described above. The aluminum subsides slightly. In a long-time run, it is preferably replenished from time to time by adding fresh aluminum chips at the top so that the tower is always filled with aluminum chips throughout its length.

EXAMPLE 2

42 gms. (0.2 mole) of sodium-butoxy-aluminum triethyl are stirred with 1.07 kgs. Hg and 1.8 gms. of aluminum shot (0.2 gram equivalents) at 120° C. in a dry 250 ml. flask filled with inert gas. After 20 hours, conversion is substantially complete. Found in the amalgam were 0.191 gram atoms of sodium corresponding to 95.3% of the theoretical amount. The liquid above the amalgam consists of a mixture of about 0.2 mole butoxy-aluminum diethyl and 0.066 mole aluminum triethyl from which the aluminum triethyl newly formed is easily separated by heating to 90° C. (measured in the liquid) under a vacuum of $10^{-3}$ mm. Hg. The aluminum butoxy diethyl contained in the distillation bottoms is re-converted in a manner known per se with NaH and ethylene into sodium-butoxy-aluminum triethyl and can be used for another reaction.

EXAMPLE 3

The reaction tower described in Example 1 and charged with aluminum chips is filled with a 1:1 molar mixture of sodium-aluminum tetraethyl and potassium-aluminum tetraethyl melting at 85° C. Heating is effected with heptane vapor of 98° C. Mercury is added dropwise at the top at a rate of 20 ml./minute. Moreover, molten sodium-aluminum tetraethyl from a heatable metering funnel is added at the top at the same rate as it is consumed by the reaction, i.e. 140 gms./hr. By the addition of the molten complex salt, the same volume of $Al(C_2H_5)_3$ formed by the reaction is displaced from the upper phase through the lateral nozzle and collected in a stock vessel of appropriate size. The sodium amalgam flowing off at the base of the reaction tower has a Na concentration of 0.12%. After a specified and sufficiently large stock of mercury (about 3 liters) has been passed three times through the reaction tower and the sodium concentration has increased to about 0.35%, sodium is anodically dissolved out of this sodium amalgam in a manner known per se in an electrolytic cell with cathodic deposition of molten sodium. The anodic amalgam which has become poor in sodium (at a flow rate of the amalgam through the electrolytic cell of 20 ml./minute, the current is adjusted to 22.7 A.) has a concentration of 0.24% Na and is re-concentrated to 0.36% Na as it flows through the reaction tower. $Al(C_2H_5)_3$ is produced at a rate of 129 gms./hr., 32 gms. thereof being newly formed. The reaction tower holds about 60 gms. of aluminum chips so that the aluminum inventory in the tower must be replenished about every 5 hours.

EXAMPLE 4

Sodium-aluminum tetra-n-butyl is fed to the reaction tower by the procedure described in Example 1. Since separation into layers between the complex salt and aluminum-tri-n-butyl produced does not occur in this case, the reaction mixture must, after about ⅔ of the complex have been reacted, be separated by distillation at the rate at which the reaction is progressing while either withdrawing it batchwise from the reaction tower or while continuously withdrawing a partial stream with simultaneous addition of fresh sodium-aluminum tetrabutyl.

The space-time yield is of a similar high order as in case of sodium-aluminum tetraethyl.

Aluminum tripropyl can be produced in a similar manner with the same yields by cleaving sodium-aluminum tetrapropyl.

EXAMPLE 5

In a dry 4 liter flask filled with inert gas, 498 gms. (3 moles) of sodium-aluminum tetraethyl are dissolved in 288 gms. (4 moles) of dry and peroxide-free tetrahydrofurane. The solution is stirred at 210° C. with 10,000 gms. (=740 ml.) of mercury and 27 gms. (1 gram atom) of aluminum shot. The increase in sodium content of the mercury is determined by sampling at intervals of 15 minutes. The increase in sodium content as a function of the reaction time is represented in Table 1.

TABLE 1

| Reaction time, minutes | Wt. percent Na in amalgam | Gram atoms Na |
| --- | --- | --- |
| 15 | 0.19 | 0.83 |
| 30 | 0.245 | 1.07 |
| 60 | 0.337 | 1.47 |
| 120 | 0.528 | 2.3 |
| 180 | 0.664 | 2.91 |
| 210 | 0.690 | 3.0 |

The sodium content after 3.5 hours corresponds to the value calculated for complete conversion. The supernatant liquid above the amalgam is pure aluminum triethyl-tetrahydrofuranate which can be obtained in analytical grade purity by distillation.

Boiling point at $5 \times 10^{-3}$ mm. Hg: 60.5–64° C. Al: found, 14.57%; calculated, 14.52%. $C_2H_5$: found, 46.4%; calculated, 46.8%.

EXAMPLE 6

53 gms. (0.32 mole) of sodium-aluminum tetraethyl, 2.9 gms. aluminum shot (0.107 gram atoms), and 1100 gms. of mercury are heated to 190–195° C. in a dry 500 ml. flask filled with inert gas. Then 43 gms. (0.427 mole) of dry triethylamine free from diethylamine and ethylamine are added dropwise from a dropping funnel at a sufficiently low rate to the mixture which is at 195° C. that the temperature of the reaction mixture does not drop below 190° C. The amine can be added within about 15 to 20 minutes. The increase in sodium concentration in the amalgam is again followed by sampling at intervals of 15 minutes and determination of the alkali. The results are listed in Table 2.

TABLE 2

| Reaction time, minutes | Wt. percent Na | Gram atoms Na |
| --- | --- | --- |
| 15 | 0.3775 | 0.18 |
| 30 | 0.504 | 0.24 |
| 60 | 0.58 | 0.28 |
| 90 | 0.63 | 0.3 |
| 180 | 0.63 | 0.3 |

The reaction is substantially completed after 90 minutes, the conversion being quantitative (Na content in the amalgam: calculated, 0.65% by weight; found 0.63% by weight).

Other tertiary amines and ethers such as tributylamine, tripropylamine, ethyl-propyl-butylamine, dimethyl aniline, diethyl aniline, diethyl ether, dipropyl ether, diisopropyl ether, dibutyl ether, diamyl ether, ethyl-propyl ether, ethyl-butyl ether, methyl-amyl ether, dioctyl ether; cyclic ethers such as dioxane, tetrahydrofurane, and polyethers may be used in an analogous manner in place of triethylamine.

EXAMPLE 7

In a dry 500 ml. flask filled with inert gas, 88 gms. (0.3 mole) of sodium-n-decyloxy-aluminum triethyl are stirred with 1000 gms. of mercury and 2.7 gms. (0.1 gram atom) of aluminum shot at 140° C. The conversion is completed after 20 hours. Sodium in amount of 0.68% by weight corresponding to 0.295 gram atoms, i.e. 97.3% of the theoretical value are found in the amalgam. The supernatant liquid above the amalgam consists of a mixture of 0.3 mole decyloxy-aluminum diethyl and 0.1 mole aluminum triethyl. By heating to about 90° C. (measured in the liquid) under a vacuum of $10^{-3}$ mm. Hg, 11 gms. aluminum triethyl (0.096 mole) are easily distilled from this mixture.

The decyloxy-aluminum diethyl contained in the distillation bottoms can be re-converted in a manner known per se with NaH and ethylene into sodium-decyloxy-aluminum triethyl and charged to another conversion.

EXAMPLE 8

In a dry 4 liter flask filler with inert gas, 728 gms. (4 moles) of sodium-ethoxy-aluminum triethyl are heated with 10,000 gms. of mercury and 27 gms. (1 gram atom) of aluminum grit at 165° C. while vigorously stirring. The reaction is completed after 5 hours. The sodium amalgam contains 0.69% by weight Na, i.e. 3 gram atoms of sodium. The supernatant liquid above the amalgam consists of two phases, the lower phase consisting of sodium-aluminum tetraethyl (1 mol) saturated with ethoxy-aluminum diethyl, and the upper phase being ethoxy-aluminum diethyl (4 moles).

EXAMPLE 9

48 gms. of an equimolar mixture of 0.175 mole each of sodium-aluminum tetraethyl and sodium-aluminum tetramethyl are dissolved in 25.7 gms. (0.35 mole) of dry and peroxide-free tetrahydrofurane and heated with 1150 gms. of mercury and 4 gms. (0.148 gram atom) of aluminum shot, contained in a dry 500 ml. flask filled with inert gas, for 5 hours at 160° C. while vigorously stirring. Upon cooling to 80° C., the upper liquid phase is separated from the mercury and distilled under a vacuum of 0.04 mm. Hg at a bath temperature of 80–100° C. Distillate in amount of 58 gms. passes over between 45 and 76° C. (measured in the vapor). Analysis shows the distillate to exist of an almost exactly equimolar mixture of aluminum-triethyl tetrahydrofurnate and aluminum trimethyl tetrahydrofurnate. The alkali content in the mercury was found to be 0.696 wt. percent corresponding to a sodium quantity of 8.05 gms. (=0.35 gram atom). It follows from this that the reaction has proceeded quantitatively.

EXAMPLE 10

44.0 gms. (0.4 mole) of sodium-aluminum tetramethyl are dissolved in 29 gms. of dry tetrahydrofurane and heated for 3 hours at 160° C. together with 1200 gms. of mercury and 3.6 gms. (0.133 gram atom) of aluminum shot while vigorously stirring. Upon cooling, the upper liquid phase is separated from the sodium amalgam and distilled with a 50 ml. Vigreux column at a bath temperature of 150° C. without the use of vacuum. At 126° C., 9 grams (0.13 mole) of pure aluminum trimethyl distil. After having changed the receiver, distillation is continued under a vacuum of 10 mm. Hg at the same temperature of the oil bath. At 90° C., 57 grams (0.4 mole) of aluminum trimethyl tetrahydrofuranate distil. The alkali content in the mercury is found to be 0.768% by weight corresponding to a sodium content of 9.2 gms. (=0.4 gram atom).

What is claimed is:

1. A process for the preparation of organic aluminum compounds, which comprises reacting a member selected from the group consisting of sodium aluminum tetraalkyl and sodium alkoxy aluminum trialkyl with aluminum in the presence of mercury, and recovering the organic aluminum compounds thereby formed.

2. A process according to claim 1, wherein said group member is sodium aluminum tetraalkyl and said organic aluminum compound formed is aluminum trialkyl.

3. A process according to claim 1, wherein said group member is sodium alkoxy aluminum trialkyl and the organic aluminum compounds formed are aluminum trialkyl and alkoxy aluminum dialkyl.

4. A process according to claim 1, wherein said group member is sodium aluminum tetraalkyl and there is additionally incorporated into the reaction mixture potassium aluminum tetraalkyl.

5. A process according to claim 1, which comprises effecting said reaction at a temperature of from 60 to 250° C.

6. A process according to claim 1, which comprises effecting said reaction at a temperature of from 85° to 160° C.

7. A process according to claim 1, which comprises effecting said reaction at a pressure of from atmospheric up to 5 atmospheres.

8. A process according to claim 1, which comprises effecting said reaction in the presence of a solvent.

9. A process according to claim 8, wherein said solvent is a member selected from the group consisting of aromatic hydrocarbons, ethers, and tertiary amines.

10. A process according to claim 1, wherein said group member is sodium aluminum tetraalkyl and said reaction is effected so that the sodium content of the sodium amalgam formed during the reaction does not exceed 0.7%.

11. A process according to claim 1, wherein said group member is sodium alkoxy aluminum trialkyl and said reaction is effected so that the sodium content of the sodium amalgam formed during the reaction does not exceed 1.5%.

12. A process according to claim 1, which comprises employing an excess of aluminum in the reaction.

13. A process according to claim 12, wherein an excess of aluminum amounting to 5–10% is utilized.

14. A process according to claim 1, which comprises the additional steps of separating the sodium from the sodium amalgam formed during the reaction by electrolysis, converting the separated sodium with hydrogen into sodium hydride, reacting said sodium hydride with aluminum trialkyl to form sodium aluminum trialkyl hydride, reacting the sodium aluminum trialkyl hydride thereby formed with an olefin to form sodium aluminum tetraalkyl and passing said sodium aluminum tetraalkyl back into the reaction.

15. A process according to claim 1, which comprises utilizing four mols of sodium alkoxy aluminum trialkyl per mol of aluminum in the reaction to thereby produce four mols of aluminum alkoxy dialkyl and one mol of sodium aluminum tetralkyl.

References Cited

UNITED STATES PATENTS 2,786,860   3/1957   Ziegler et al. -------- 260—448

TOBIAS E. LEVOW, *Primary Examiner.*

H. M. S. SNEED, *Assistant Examiner.*